United States Patent
Grabherr

(10) Patent No.: US 11,300,042 B2
(45) Date of Patent: Apr. 12, 2022

(54) VALVE DEVICE FOR A TURBINE OF AN EXHAUST GAS TURBOCHARGER, AND TURBINE FOR AN EXHAUST GAS TURBOCHARGER

(71) Applicant: Bayerische Motoren Werke Aktiengesellschaft, Munich (DE)

(72) Inventor: Oliver Grabherr, Munich (DE)

(73) Assignee: Bayerische Motoren Werke Aktiengesellschaft, Munich (DE)

(*) Notice: Subject to any disclaimer, the term of this patent is extended or adjusted under 35 U.S.C. 154(b) by 0 days.

(21) Appl. No.: 16/784,633

(22) Filed: Feb. 7, 2020

(65) Prior Publication Data

US 2020/0173353 A1  Jun. 4, 2020

Related U.S. Application Data

(63) Continuation of application No. PCT/EP2018/071050, filed on Aug. 2, 2018.

(30) Foreign Application Priority Data

Aug. 10, 2017 (DE) .................... 10 2017 213 940.4

(51) Int. Cl.
*F02B 37/18* (2006.01)
*F01D 17/10* (2006.01)
(Continued)

(52) U.S. Cl.
CPC .......... *F02B 37/186* (2013.01); *F01D 17/105* (2013.01); *F01D 17/14* (2013.01);
(Continued)

(58) Field of Classification Search
CPC ...... F02B 37/186; F02B 37/18; F02B 37/183; F01D 17/105; F01D 17/14; F16K 1/2007;
(Continued)

(56) References Cited

U.S. PATENT DOCUMENTS

| 10,215,989 B2 | 2/2019 | Uneura et al. |
| 2015/0147162 A1 | 5/2015 | Stilgenbauer et al. |

(Continued)

FOREIGN PATENT DOCUMENTS

| CN | 102414418 A | 4/2012 |
| CN | 106536891 A | 3/2017 |

(Continued)

OTHER PUBLICATIONS

PCT/EP2018/071050, International Search Report dated Oct. 15, 2018 (Two (2) pages).
(Continued)

*Primary Examiner* — Audrey B. Walter
*Assistant Examiner* — Edward Bushard
(74) *Attorney, Agent, or Firm* — Crowell & Moring LLP

(57) ABSTRACT

A valve device for a turbine of an exhaust gas turbocharger includes a valve element for at least partial fluidic shutting of a bypass line via which a turbine wheel of the turbine can be bypassed by exhaust gas. The valve device also has an actuating arm which is coupled in an articulated manner to the valve element and via which the valve element can be pivoted and has at least one spring element via which the valve element is supported on the actuating arm. The valve element has at least one uneven supporting surface via which the spring element is supported on the valve element.

10 Claims, 1 Drawing Sheet

(51) Int. Cl.
  *F01D 17/14* (2006.01)
  *F16K 1/20* (2006.01)
  *F16K 1/22* (2006.01)
  *F16K 1/36* (2006.01)

(52) U.S. Cl.
  CPC ............ *F16K 1/2007* (2013.01); *F16K 1/221* (2013.01); *F16K 1/36* (2013.01); *F05D 2220/40* (2013.01)

(58) Field of Classification Search
  CPC ........ F16K 1/221; F16K 1/36; F05D 2220/40; F05D 2230/64; F05D 2260/52; Y02T 10/12
  See application file for complete search history.

(56) References Cited

U.S. PATENT DOCUMENTS

| | | | |
|---|---|---|---|
| 2017/0122192 A1* | 5/2017 | Uneura | F01D 17/105 |
| 2017/0248071 A1* | 8/2017 | Diemer | F16K 31/44 |
| 2019/0003376 A1* | 1/2019 | Schawer | F16C 27/02 |

FOREIGN PATENT DOCUMENTS

| | | | |
|---|---|---|---|
| DE | 10 2011 017 523 A1 | 10/2012 | |
| DE | 20 2007 019 447 U1 | 10/2012 | |
| DE | 20 2013 006 731 U1 | 10/2013 | |
| DE | 10 2015 108 824 A1 | 12/2016 | |
| DE | 11 2015 903 961 T5 | 5/2017 | |
| DE | 10 2016 002 269 A1 | 8/2017 | |
| EP | 3 211 197 A1 | 8/2017 | |
| EP | 3211197 A1 * | 8/2017 | ............ F02B 37/183 |
| WO | WO 2010/135104 A2 | 11/2010 | |
| WO | WO 2016/031448 A1 | 3/2016 | |

OTHER PUBLICATIONS

German Search Report issued in German counterpart application No. 10 2017 213 940.4 dated Apr. 9, 2018, with Statement of Relevancy (Ten (10) pages).

Chinese Office Action issued in Chinese application No. 201880046126.9 dated Mar. 3, 2021, with English translation (Fifteen (15) pages).

* cited by examiner

VALVE DEVICE FOR A TURBINE OF AN EXHAUST GAS TURBOCHARGER, AND TURBINE FOR AN EXHAUST GAS TURBOCHARGER

CROSS REFERENCE TO RELATED APPLICATIONS

This application is a continuation of PCT International Application No. PCT/EP2018/071050, filed Aug. 2, 2018, which claims priority under 35 U.S.C. § 119 from German Patent Application No. 10 2017 213 940.4, filed Aug. 10, 2017, the entire disclosures of which are herein expressly incorporated by reference.

BACKGROUND AND SUMMARY OF THE INVENTION

The invention relates to a valve device for a turbine of an exhaust gas turbocharger. Furthermore, the invention relates to a turbine for an exhaust gas turbocharger.

Such a valve device for a turbine of an exhaust gas turbocharger and such a turbine for an exhaust gas turbocharger are already known, for example, from DE 10 2015 108 284 A1. The valve device here has a valve element for at least partially fluidically blocking a bypass line via which a turbine wheel of the turbine can be bypassed by exhaust gas. This means that exhaust gas which flows through the bypass line bypasses the turbine wheel and accordingly does not drive the turbine wheel. In particular, the valve element or the valve device is used in order to set a quantity of the exhaust gas flowing through the bypass line, as a result of which, for example, a charging pressure of the exhaust gas turbocharger can be set, in particular adjusted. The valve device is also referred to here as a wastegate or wastegate valve.

The valve device furthermore has an actuating arm which is coupled in an articulated manner to the valve element and via which the valve element is pivotable. In addition, at least one spring element is provided via which the valve element is supported on the actuating arm.

Such a valve device is also already known from US 2015/0147162 A1.

Furthermore, DE 20 2007 019 447 U1 discloses a turbocharger, with a turbine housing which has an adjusting device for changing an exhaust gas quantity flowing through a turbine.

It is the object of the present invention to provide a valve device and a turbine with particularly high robustness.

A first aspect of the invention relates to a valve device for a turbine of an exhaust gas turbocharger, in particular of an internal combustion engine. The valve device has a valve element which, for example, is designed to be at least substantially disk-like or disk-shaped and therefore, for example, as a disk valve. The valve element is also referred to, for example, as a flap, wastegate flap or bypass flap. The valve device is referred to, for example, as a wastegate or wastegate valve.

A turbine wheel of the turbine can be bypassed by exhaust gas via the bypass line. This means in particular that exhaust gas which flows through the bypass line bypasses the turbine wheel and accordingly does not drive the turbine wheel. The bypass line is also referred to as a bypass, bypass channel or wastegate channel. In particular, the valve element or the valve device is used overall in order to set a quantity of the exhaust gas flowing through the bypass line, as a result of which, for example, a charging pressure of the exhaust gas turbocharger can be set, in particular adjusted.

The valve device furthermore has an actuating arm which is coupled in an articulated manner to the valve element and via which the valve element is pivotable. The feature of the actuating arm being coupled in an articulated manner to the valve element can be understood as meaning in particular that the actuating arm and the valve element are movable relative to each other, in particular within certain or predefinable limits, while the valve element is connected to the actuating arm or is held on the actuating arm. By means of the possibility of moving the valve element relative to the actuating arm, for example, in particular manufacturing-induced, tolerances can be compensated for, and therefore, for example, the bypass line can be opened up and blocked to meet requirements. In particular, it is possible, for example, to pivot, that is to say to move, the valve element between a closed position and at least one open position via the actuating arm. In the closed position, for example, at least one part of the bypass line is fluidically blocked by means of the valve element, whereas the valve element opens up at least one part in the open position. In order to pivot the valve element via the actuating arm, for example, the actuating arm is actuated in particular by means of an actuator such as, for example, an electric linear or rotary actuator or a pressure capsule, in particular a negative pressure capsule, and, in the process, is, for example, pivoted.

The valve device furthermore has at least one spring element via which the valve element is supported on the actuating arm. The spring element is, for example, pretensioned and therefore has a pretension such that the spring element, for example, provides a spring force which, for example, acts on the valve element. The spring force can be used, for example, to hold the valve element in at least one starting position, in particular relative to the actuating arm, such that, for example, in the closed position, at least the part of the bypass line can be reliably fluidically blocked by means of the valve element.

In order now to realize a particularly high robustness of the valve device, it is provided according to the invention that the valve element has at least one uneven supporting surface via which the spring element is supported on the valve element. The feature of the supporting surface being uneven can be understood as meaning in particular that the supporting surface is designed consciously or specifically to be uneven and therefore has an uneven shape different from an even shape, as a result of which a particularly high degree of robustness can be provided.

The invention is based in particular on the finding that it is possible to configure the actuating arm, which is also referred to as a wastegate arm, integrally with the valve element, also referred to, for example, as a wastegate disk, as a result of which, for example, what is referred to as a monoblock valve, which is also referred to as a monoblock wastegate, is provided. However, a multi-part configuration, in which the actuating arm and the valve element are designed as components which are formed separately from each other and are connected to each other in an articulated manner has been shown to be advantageous since, by this means—as previously described—the valve element can be connected to the actuating arm in such a manner that the valve element is movable relative to the actuating arm, or vice versa. This relative movability makes it possible to compensate for tolerances, such as, for example, manufacturing and position tolerances, as a result of which, for example, the valve element in its closed position can sit in a defined manner on a corresponding valve seat in order thereby to be able to block at least the part of the bypass line or the bypass line completely.

The multi-part configuration described provides, for example, a multi-part wastegate which comprises the valve element and the actuating arm as components which are connected in an articulated manner to each other and are thereby movable relative to each other. However, it has been found that, in the multi-part configuration, the valve element and the actuating arm can be excited into vibrations, and therefore, for example, at certain operating points and load states, acoustic noises in the form of rattling, clattering and/or buzzing, or increased material wear may occur. In order to counteract such a production of undesirable excessive noises or component wear, use is made of the spring element which is configured, for example, as a disk spring. The spring element can be provided in different constructional forms and/or geometrical forms and, for example, can avoid excessive relative movements between the valve and the actuating arm and excessive noises resulting therefrom.

However, in conventional valve devices, the disadvantage has been identified that the spring element, in addition to its pretension, which is also referred to as installation pretension, is deformed during operation of the turbine due to relative movements between the valve element and the actuating arm, for example, whenever the valve element is deflected relative to the actuating arm. The spring element is customarily of delicate configuration and, because of its position, reaches high temperatures, and therefore the spring element in conventional valve devices has a tendency to wear out. As a result, losses in pretension can occur and ultimately reduced efficiency or even failure of the spring element. This can be reinforced by the fact that the spring element plasticizes, that is to say is not deformed or is not only deformed elastically, but rather plastically, because of relative movements between the valve element and the actuating arm.

The valve device according to the invention now makes it possible to avoid the abovementioned disadvantages and problems, in particular both the production of undesirable noises and an excessive loading of the spring element, and in particular undesirable plastic deformations of the spring element. In other words, it is possible, by means of the uneven configuration of the supporting surface, to avoid excessive loads acting on the spring element and, as a result, undesirable plastic deformations of the spring element, and therefore the spring element in its installed position retains its pretension even over a long service life. Furthermore, the probability of plastic deformations of the spring element occurring during operation of the turbine can be kept particularly low, and therefore the spring element maintains its desired functionality even over a long service life of the turbine. In other words, it has been found that the invention is distinguished in that the spring element beyond its pretension in the installed position is not, for example due to structural dynamic and/or thermomechanical loading, additionally loaded and damaged by excessive deformation and plasticization which can conventionally come about from a deflection of the valve element relative to the actuating arm. As a result, the valve device according to the invention is more robust in comparison to conventional valve devices and is therefore inconspicuous acoustically and with regard to component wear over the service life.

The invention is based in particular on the concept of configuring a geometry of the valve element in such a manner that the spring element beyond its pretension in its installed position and via structural-dynamic and thermo-mechanical loading acting on the spring element during the operation of the turbine does not experience any further load-relevant, in particular plasticizing deformation if, for example because of the operation, a relative movement occurs between the valve element and the actuating arm. This is realized according to the invention by the fact that the supporting surface is configured to be uneven. In other words, the spring element is not tensioned beyond its pretension when the valve element is moved relative to the actuating arm.

It has been shown to be particularly advantageous if the supporting surface of the valve element is uneven and has a shape different from a conical shape or from a cone or truncated cone.

It has furthermore been shown to be particularly advantageous if, for example, the supporting surface of the valve element extends in a completely encircling, that is to say completely closed, manner in the circumferential direction of the valve element, and therefore the supporting surface is, for example, a closed ring or has the shape of a closed ring.

It has been shown here to be particularly advantageous if the supporting surface is arranged on a side, in particular rear side, of the valve element facing at least a partial region of the spring element. The side, in particular rear side, is, for example, a side of the valve element that faces the actuating arm or points to the actuating arm. By this means, a particularly advantageous and in particular low-load support can be realized, and therefore the probability that undesirable deformations, in particular plastic deformations, of the spring element will occur can be kept particularly small.

A further embodiment is distinguished in that the spring element directly touches or contacts the supporting surface. By this means, excessive, in particular plastic, deformation of the spring element can be particularly readily avoided.

It has been shown to be particularly advantageous if the supporting surface is curved. Such a curved configuration of the supporting surface permits a particularly advantageous support of the valve element on the actuating arm via the spring element. At the same time, undesirable or excessive, in particular plastic, deformations of the spring element can be avoided, and therefore particularly high robustness can be provided.

It has been shown to be particularly advantageous if the supporting surface is convex, that is to say, for example, is curved toward the spring element or outward, as a result of which excessive loadings can be particularly readily avoided.

In a particularly advantageous embodiment of the invention, the spring element has at least one uneven second supporting surface via which the spring element is supported on the first supporting surface. A particularly advantageous supporting of the valve element on the spring element or vice versa can thereby be provided, and therefore excessive loadings and resulting undesirable deformations of the spring element can be avoided over a long service life.

It has been shown to be particularly advantageous here if the second supporting surface is curved, in particular concavely or convexly, such that, for example, the second supporting surface is curved away from the first supporting surface or inward. By this means, particularly high robustness can be provided.

Finally, it has been shown to be particularly advantageous if the supporting surfaces are adapted to each other in respect of their respective shapes. By this means, for example, local loading peaks can be avoided since, for example, unfavorable linear or punctiform contacts between the supporting surfaces can be avoided. The feature of the supporting surfaces being adapted to each other in respect of their respective shapes can be understood as meaning in particular that, for example, the first supporting surface has a positive contour, wherein the second supporting surface has a negative contour which corresponds to the positive contour and is adapted to the positive contour.

A second aspect of the invention relates to a turbine for an exhaust gas turbocharger, in particular an internal combustion engine. The turbine comprises a valve device, in particular a valve device according to the invention. The valve device here has a valve element for at least partially fluidically blocking a bypass line via which a turbine wheel of the turbine can be bypassed by exhaust gas. Furthermore, the valve device has an actuating arm which is coupled in an articulated manner to the valve element and via which the valve element is pivotable. In addition, the valve device comprises at least one spring element via which the valve element is supported on the actuating arm.

In order now to be able to realize particularly high robustness of the valve device and therefore of the turbine as a whole, it is provided according to the invention that the valve element has at least one uneven supporting surface via which the spring element is supported on the valve element. Advantages and advantageous refinements of the first aspect of the invention should be considered to be advantages and advantageous refinements of the second aspect of the invention, and vice versa.

Further details of the invention emerge from the description below of a preferred exemplary embodiment with the associated drawings.

Other objects, advantages and novel features of the present invention will become apparent from the following detailed description of one or more preferred embodiments when considered in conjunction with the accompanying drawings.

BRIEF DESCRIPTION OF THE DRAWINGS

FIG. 2 shows a further schematic and sectioned top view of part of the valve device, wherein FIG. 2 shows a movement position of the valve element different from the starting position.

DETAILED DESCRIPTION OF THE DRAWINGS

In the Figures, identical or functionally identical elements are provided with the same reference signs.

Figure 1:
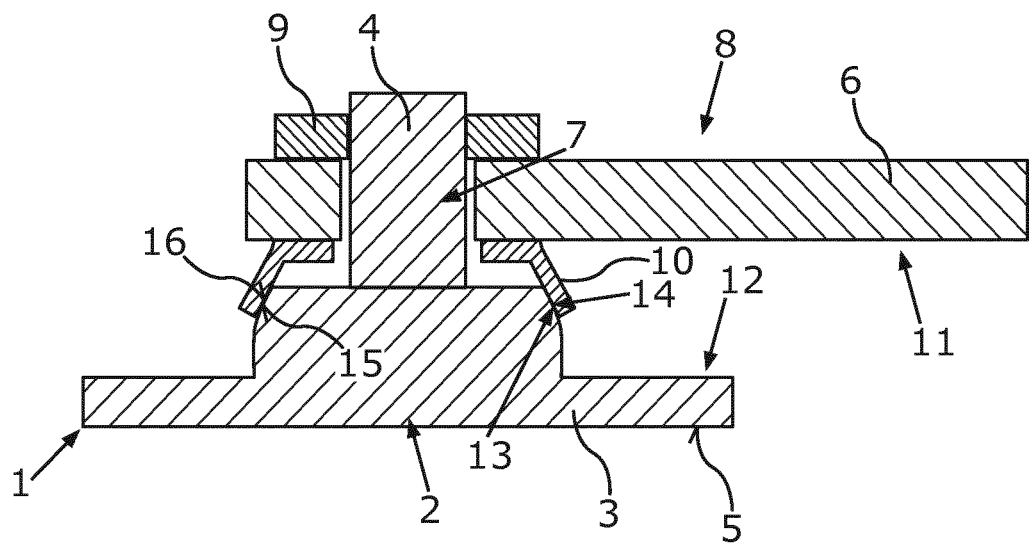
FIG. 1 shows a schematic and sectioned top view of part of a valve device according to the invention, with a valve element, with an actuating arm coupled in an articulated manner to the valve element and with a spring element via which the valve element is supported on the actuating arm, wherein the valve element has an uneven supporting surface via which the spring element is supported on the valve element, and wherein a starting position of the valve element is shown in FIG. 1.

FIG. 1 shows, in a schematic and sectioned top view, part of a valve device 1 for a turbine of an exhaust gas turbocharger, in particular for an internal combustion engine. The internal combustion engine is, for example, part of a drive train of a motor vehicle which is designed in particular as an automobile and as a passenger vehicle and is drivable by means of the drive train, in particular by means of the internal combustion engine. The internal combustion engine here has, for example, at least one combustion chamber which is designed in particular as a cylinder and in which combustion operations proceed during a fired operation of the internal combustion engine. The combustion operations result in exhaust gas of the internal combustion engine, the exhaust gas being removed from the combustion chamber by means of an exhaust train of the internal combustion engine. The turbine is arranged in the exhaust tract and, accordingly, the exhaust gas can flow through the turbine and can drive same. For this purpose, the turbine comprises a turbine housing (not shown in the Figures) with a receiving space in which a turbine wheel (not shown in the Figures) of the turbine is at least partially, in particular at least predominantly or completely, rotatably accommodated. The turbine wheel can therefore rotate relative to the turbine housing. The exhaust gas can flow through the turbine housing, wherein the exhaust gas flowing through the turbine housing can flow by means of the turbine housing to the receiving space and therefore to the turbine wheel. The turbine wheel is thereby driven by the exhaust gas.

The turbine or the exhaust gas turbocharger has at least one bypass channel through which at least some of the exhaust gas can flow. At least some of the exhaust gas can bypass the turbine wheel via the bypass channel. This means that the exhaust gas flowing through the bypass channel does not flow through the turbine wheel and accordingly does not drive the latter.

The valve device 1 has a valve element 2 which, for example, is designed at least substantially in a disk-like or disk-shaped manner and therefore, for example, as a disk valve. For this purpose, the valve element 2 comprises, for example, a valve disk 3 and a shaft 4 which is connected to the valve disk 3 and is formed, for example, integrally with the valve disk 3. The valve element 2 is movable, in particular pivotable, between a closed position and at least one open position relative to the turbine housing. In the closed position, at least a part of the bypass channel is fluidically blocked by the valve element 2, in particular by the valve disk 3, in particular the bypass channel is at least predominantly, in particular completely, fluidically blocked by means of the valve element 2, in particular by means of the valve disk 3, in the closed position. In the open position, the valve element 2 opens up at least a part of the bypass channel, and therefore exhaust gas can flow through the part. By pivoting of the valve element 2 between the open position and the closed position, for example, a quantity of the exhaust gas flowing through the bypass channel can be set, as a result of which, for example, a charging pressure of the exhaust gas turbocharger can be set, in particular adjusted. In the closed position, the valve element 2, in particular the valve disk 3, sits, for example, on a corresponding valve seat, as a result of which at least the part of the bypass channel is fluidically blocked. For example, an in particular at least substantially annular sealing surface 5 of the valve element 2, in particular of the valve disk 3, touches the corresponding valve seat.

The valve device 1 furthermore comprises an actuating arm 6 which is pivotable about a pivot axis relative to the turbine housing. The valve element 2 is coupled here in an articulated manner to the actuating arm 6, and therefore the valve element 2 is pivotable between the open position and the closed position via the actuating arm 6, that is to say by pivoting of the actuating arm 6. In other words, in order to pivot the valve element 2 between the open position and the closed position, the actuating arm 6 is pivoted here. For this purpose, for example, an actuator, not illustrated in the Figures, such as, for example, an electric linear actuator or rotary actuator or a pressure capsule, in particular a negative pressure capsule, is provided, by means of which the actuating arm 6 and, via the latter, the valve element 2 can be pivoted.

The articulated coupling of the valve element 2 to the actuating arm 6 should be understood as meaning in particular that the valve element 2—while it is connected to the actuating arm 6, can be moved, in particular pivoted, relative to the actuating arm 6. In order to couple the valve element 2 to the actuating arm 6, the actuating arm 6, for example, has a passage opening 7 which is penetrated by the shaft 4. A connecting element 9 designed, for example, as a ring is arranged on a side 8 of the actuating arm 6 that faces away from the valve disk 3, the connecting element being used to hold the valve element 2 on the actuating arm 6.

The valve device 1 furthermore comprises a spring element 10 which is also simply referred to as spring. The spring element 10 is arranged on a side 11 of the actuating arm 6 that faces away from the side 8 and therefore faces the valve disk 3, wherein the spring element 10 is arranged between the actuating arm 6 and the valve disk 3. In particular, the spring element 10 is arranged between the actuating arm 6, in particular the side 11, and a side 12 of the valve disk 3 that faces the actuating arm 6 and is also referred to as the rear side.

Figure 2:
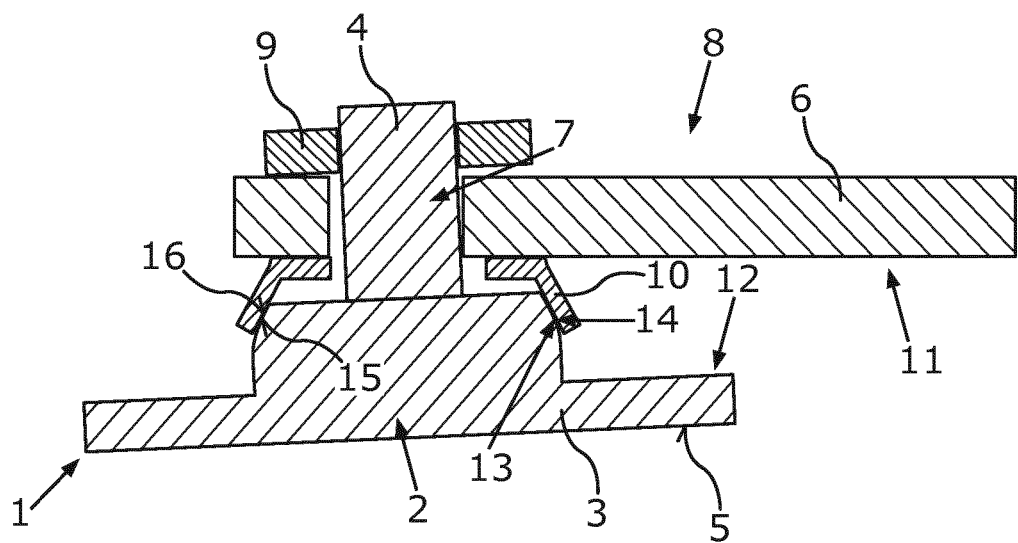

It can be particularly readily seen from FIGS. 1 and 2 that the valve element 2 is supported, in particular supported in a sprung manner, on the actuating arm 6 via the spring element 10. FIG. 1 shows a starting position of the valve element 2, wherein FIG. 2 shows a movement position of the valve element 2 different from the starting position. In the starting position shown in FIG. 1, the valve element 2 and the spring element 10 take up a respective installation position. In the starting position or in the installation position, for example, the spring element 10 is elastically deformed and thereby pretensioned such that the spring element 10 has a pretension in the starting position or in the installation position and, accordingly, provides, for example, a spring force which acts on the valve element 2 and by means of which the valve element is held in the starting position relative to the actuating arm 6. In particular, it is provided, for example, that the spring element 10 directly touches or contacts the actuating arm 6 and/or the valve element 2.

As will also be explained in more detail below, the valve device 1 is now configured in such a manner that, when, for example, the valve element 2 moves relative to the actuating arm 6 and is thereby moved from the starting position into the movement position shown in FIG. 2, the spring element 10 is not elastically deformed to a greater extent than in the starting position and therefore is not tensioned beyond the pretension. As a result, the spring element 10, for example in the starting position and in the movement position, provides at least substantially the same spring force which acts on the valve element 2 and the actuating arm 6.

In order to be able to realize this and, as a result, particularly high robustness of the valve device 1 and thereof the turbine as a whole, the valve element 2 has at least one supporting surface 16 via which the spring element 10 is supported on the valve element 2, wherein the supporting surface 16 is uneven. In the exemplary embodiment illustrated in FIGS. 1 and 2, the supporting surface 16 is uneven and has a shape different from a conical shape. In particular, the supporting surface 16 is designed, for example, to be at least substantially spherical or globular or parabolic or ball-shaped. The supporting surface 16 is arranged here on a side 14 of the valve element 2 that faces at least a partial region 13 of the spring element 10, wherein, in the exemplary embodiment illustrated in FIGS. 1 and 2, the supporting surface 16 is arranged on the rear side (side 12) of the valve disk 3.

In addition, it is provided in the exemplary embodiment that the spring element 10 directly touches or contacts the supporting surface 16. In addition, the supporting surface 16 is designed to be curved and convex, and therefore the supporting surface 16 is curved toward the spring element 10.

By means of this configuration of the supporting surface 16, a geometry of the valve element 2, in particular of the supporting surface 16, is provided in such a manner that the spring element 10 via its pretension provided in the installation position and via a gas-dynamic and thermal loading acting on the spring element 10 during operation of the turbine and brought about, for example, by the exhaust gas, does not experience any further loading-relevant, in particular plasticizing deformation if, for example because of the operation, a relative movement occurs between the valve element 2 and the actuating arm 6. In other words, the spring beyond its pretension in the installation position and the thermal loading during the operation is not additionally loaded and damaged by deformation and plasticization if the valve element 2 is moved relative to the actuating arm 6.

By means of this design of the valve element 2, in particular of the supporting surface 16, the spring element 10 both in the starting position and in the movement position and also in all other movement positions into which the valve element 2 can be moved relative to the actuating arm 6, is at least substantially identically elastically deformed and therefore provides the at least substantially identical spring force, and therefore movement of the valve element 2 out of the starting position does not cause a further elastic deformation and also does not cause a plastic deformation of the spring element 10, but rather the spring element 10 has its pretension, for example, both in the starting position and in the movement positions and provides the spring force.

In particular, it can be provided that the spring element 10 has a second supporting surface 15 via which the spring element 10 is supported on the first supporting surface 16 and therefore on the valve element 2. The second supporting surface 15 is preferably of uneven design here, wherein preferably the second supporting surface 15 directly touches or contacts the first supporting surface 16. In particular, it is conceivable for the second supporting surface 15 to be curved, in particular concavely or convexly. Furthermore, it is possible for the second supporting surface 15 to be formed of even design. It is preferably provided that the supporting surfaces 16 and 15 are adapted to each other in respect of their respective shapes, and therefore, for example, the supporting surface 15 is adapted in respect of its curvature to the curvature of the supporting surface 16, or vice versa. By this means, particularly high robustness can be provided. In addition, it is possible for the second supporting surface 15 to be designed as a convex bead which is then opposed to the first supporting surface 16 and, instead of surface contact, has only linear contact with the first supporting surface 16.

The supporting surfaces 15 and 16 preferably contact or touch each other directly. Furthermore, it is provided that the supporting surface 15 is at least partially, in particular at least predominantly or completely, arranged in the partial region 13 or is formed by the latter, and therefore the supporting surfaces 15 and 16 face each other and can therefore directly touch each other.

It is preferably provided that the supporting surfaces 15 and 16 are completely closed or encircle in a completely closed manner, for example in the circumferential direction of the spring element 10 or of the valve element 2, and are therefore, for example, of annular design. For example, the supporting surface 15 forms a receiving region or receiving space in which the supporting surface 16 is accommodated, and therefore, for example, the supporting surface 15 is arranged on opposite sides, in the direction of which the valve element 2 is supported on the spring element 10 via the supporting surface 16 or on the supporting surface 16.

LIST OF REFERENCE CHARACTERS

1 Valve device
2 Valve element
3 Valve disk
4 Shaft
5 Sealing surface
6 Actuating arm
7 Through opening
8 Side
9 Connecting element
10 Spring element
11 Side
12 Side
13 Partial region
14 Side
15 Second supporting surface
16 First supporting surface The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A valve device for a turbine of an exhaust gas turbocharger, comprising:
   a valve element for at least partially fluidically blocking a bypass line via which a turbine wheel of the turbine is bypassable by exhaust gas;
   an actuating arm which is coupled in an articulated manner to the valve element and via which the valve element is pivotable; and
   a spring element via which the valve element is supported on the actuating arm;
   wherein the valve element has a first uneven supporting surface via which the spring element is supported on the valve element; and
   wherein the first uneven supporting surface includes a rounded corner.

2. The valve device according to claim 1, wherein the first uneven supporting surface is disposed on a side of the valve element that faces a partial region of the spring element.

3. The valve device according to claim 1, wherein the spring element directly touches the first uneven supporting surface.

4. The valve device according to claim 1, wherein the first uneven supporting surface is convex.

5. The valve device according to claim 1, wherein the spring element has a second uneven supporting surface via which the spring element is supported on the first uneven supporting surface and wherein the second uneven supporting surface and the first uneven supporting surface are adapted to each other with respect to their respective shapes.

6. The valve device according to claim 1, wherein the spring element has a second uneven supporting surface or an even supporting surface via which the spring element is supported on the first uneven supporting surface.

7. The valve device according to claim 6, wherein the second uneven supporting surface or the even supporting surface directly touches the first uneven supporting surface.

8. The valve device according to claim 1, wherein the spring element has a second uneven supporting surface via which the spring element is supported on the first uneven supporting surface and wherein the second uneven supporting surface is curved.

9. The valve device according to claim 8, wherein the second uneven supporting surface is curved concavely or convexly.

10. A turbine for an exhaust gas turbocharger, comprising:
    a valve device, wherein the valve device includes:
    a valve element for at least partially fluidically blocking a bypass line via which a turbine wheel of the turbine is bypassable by exhaust gas;
    an actuating arm which is coupled in an articulated manner to the valve element and via which the valve element is pivotable; and
    a spring element via which the valve element is supported on the actuating arm;
    wherein the valve element has an uneven supporting surface via which the spring element is supported on the valve element; and
    wherein the uneven supporting surface includes a rounded corner.

* * * * *